(12) United States Patent
Nush

(10) Patent No.: US 8,316,399 B1
(45) Date of Patent: Nov. 20, 2012

(54) ENABLING PROGRAMMING OF RECORDINGS

(75) Inventor: Peter G. Nush, Ashburn, VA (US)

(73) Assignee: AOL Inc., Dulles, VA (US)

( * ) Notice: Subject to any disclaimer, the term of this patent is extended or adjusted under 35 U.S.C. 154(b) by 3837 days.

(21) Appl. No.: 10/259,791

(22) Filed: Sep. 30, 2002

Related U.S. Application Data (60) Provisional application No. 60/361,278, filed on Mar. 4, 2002.

(51) Int. Cl.
   *G06F 3/00* (2006.01)
   *G06F 13/00* (2006.01)
   *H04N 5/445* (2011.01)

(52) U.S. Cl. .......................... 725/58; 725/55

(58) Field of Classification Search .................. 725/55, 725/58, 83, 89, 100, 109, 110, 120, 121
   See application file for complete search history.

(56) References Cited

U.S. PATENT DOCUMENTS

| | | | |
|---|---|---|---|
| 6,078,348 A * | 6/2000 | Klosterman et al. | 725/40 |
| 6,177,931 B1 * | 1/2001 | Alexander et al. | 725/52 |
| 6,781,608 B1 * | 8/2004 | Crawford | 715/758 |
| 2002/0087661 A1 * | 7/2002 | Matichuk et al. | 709/218 |
| 2002/0144273 A1 * | 10/2002 | Reto | 725/86 |
| 2003/0009766 A1 * | 1/2003 | Marolda | 725/97 |
| 2005/0028208 A1 * | 2/2005 | Ellis et al. | 725/58 |

OTHER PUBLICATIONS

"What is UltimateTV," http://www.ultimatetv.com, Sep. 4, 2002, 1 page.
"What is UltimateTV—Features," http://www.ultimatetv.com/whatis.asp, Sep. 4, 2002, 1 page.
"About TiVo Inc. TiVo and ZDTV "Get Networked": Will Pursue Delivery of Cyber-programming to TiVo's Personal TV Service", http://www.tivo.com/about/0126336.html, Jan. 20, 1999, 2 pages.
*SONICblue Inc.*, "Price reduction and new service option on award-winning ReplayTV 4500 Digital Video Recorder!", www.replaytv.com, Sep. 4, 2002, 1 page.

* cited by examiner

*Primary Examiner* — Pankaj Kumar
*Assistant Examiner* — Charles N Hicks
(74) *Attorney, Agent, or Firm* — Finnegan, Henderson, Farabow, Garrett & Dunner, LLP (57) ABSTRACT

Enabling a first user to send to a second user a promotional program icon used to enable recording of a program promoted by the icon includes enabling the first user to access a display of content accessible via a network environment. The display of content includes the promotional program icon, and the first user is able to select the promotional program icon and request presentation of the icon to a second user.

32 Claims, 11 Drawing Sheets

CONVENTIONAL ART

Setup Options

You have setup more than one recording device for your screenname. Which one should we send this request to?

705 ◉ Living Room VCR
◉ Bedroom STB
◉ Family Room VCR

Which program would you like to record?

707 ◉ Sopranos
◉ Friends

What would you like to do?
710 — Record this program
715 —◉ Just this episode
720 —◉ Get a Season Pass
725 —◉ Highest Priority
730 —◉ Lowest priority 735 — Remind me about this program
740 —◉ Just this episode
745 —◉ Every episode
750 —◉ Add to my calendar
755 —◉ Set a reminder
760 —◉ Set an Alert 765 — Send this promotion to my friend
770 —◉ In a Mail message
775 —◉ In an Instant Message 785 [ Cancel ]    780 [ Submit ]

ENABLING PROGRAMMING OF RECORDINGS

CROSS-REFERENCE TO RELATED APPLICATIONS

This application claims priority from U.S. Provisional Application No. 60/361,278, filed Mar. 4, 2002, and titled ENABLING PROGRAMMING OF PERSONAL VIDEO RECORDINGS, which is hereby incorporated by reference in its entirety for all purposes.

TECHNICAL FIELD

This document relates to enabling programming of personal recordings over a communications system.

BACKGROUND

Personal recording devices allow users to record programs of interest for later viewing or listening. Such programs may include video programs (e.g., television programs) and/or music programs (e.g., radio music or music playing from a recording medium such as a tape or a compact disc). Examples of personal video recording devices include video cassette recorders (VCRs), digital video disc (DVD) recorders, and digital recording set top boxes. Examples of personal music recording devices include tape players, CD players, dictaphones, and MPEG layer 3 (MP3) players.

The vast majority of personal recording devices are programmable. Programmable personal recording devices may be directed by users to record programs at user-specified times. For example, a user may direct the programmable personal recording device to record a program immediately and/or at one or more set times in the future. Programming such recording devices typically requires that the user physically touch or be physically near the programmable recording device.

SUMMARY

In one general aspect, enabling a first user to send to a second user a promotional program icon used to enable recording of a program promoted by the icon includes enabling the first user to access a display of content accessible in a network environment. The display of content includes the promotional program icon, and the first user is able to select the promotional program icon and request presentation of the icon to a second user. The program promoted by the promotional program icon may be a video program.

Enabling the user to request presentation of the program icon may include enabling the user to electronically send the promotional program icon to the second user. The promotional program icon may be sent in an e-mail or in an instant message.

The first user may perceive a set of options upon selecting the promotional program icon including an option to electronically send the promotional program icon to another user. The set of options may include one or more of the following options: an option to record the program promoted by the promotional program icon one time or periodically, an option to add schedule data of the program promoted by the promotional program icon to a calendar of the user, an option to set an alert that will inform the user when the program is being shown or will be shown, an option to add the program promoted by the selected promotional program icon to a preferred list of programs to record, and an option to set a conflict priority rating used to determine whether the program will be recorded when a recording schedule of the program conflicts with a recording schedule of another program.

The set of options may dynamically change based on identification data including user identification data and recording device identification data. The second user is also able to perceive the set of options upon selecting the promotional program icon.

Implementations of the techniques described above may include a method or process, an apparatus or a system, or computer software on a computer-accessible medium.

Other features will be apparent from the description, the drawings, and the claims.

DETAILED DESCRIPTION

A web-site that is unrelated to the scheduling of program recordings includes a promotional program icon that may be selected by a user to inspire delivery of information to a second user, thereby enabling programming of a personal recording device at the second user to record at least one of the programs promoted by the program icon. The second user receives the promotional program icon in an e-mail or in an instant message and, upon selecting the promotional program icon, is presented with a set of options.

The set of options includes the option to record one or more of the programs promoted by the promotional program icon using a personal recording device. The set of options also includes the option to send the promotional program icon in an e-mail or in an instant message to another user.

The web-site thus provides a user with the ability to inform other users of interesting programs and to send to those other users a convenient mechanism to record the programs (i.e., by selecting the icon and choosing recording options). In return, the web-site provider benefits by offering a more effective advertising option to program promoters. The promotional program icon, unlike typical web-site banners or icons, is programmed to be easily replicated and passed along from user to user. This viral replication of the promotional program icon results in more users being exposed to the program promotion, more users recording the promoted programs, and, ultimately, more users watching the promoted programs.

Figure 1:
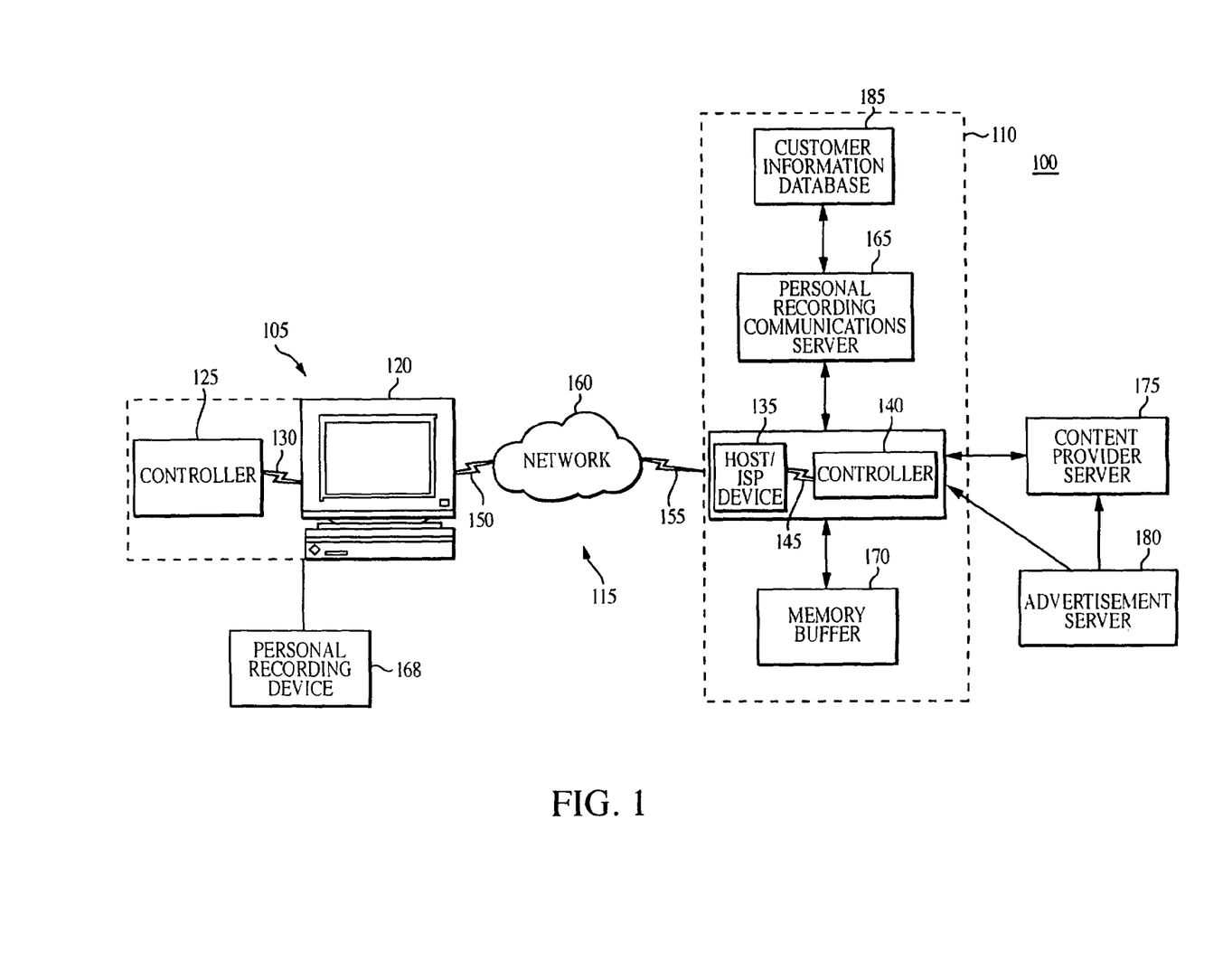
FIG. 1 is a block diagram of a communications system that enables users to program personal recording devices over a network.

Referring to FIG. 1, a communications system 100 that enables users to program personal recording devices over a network is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host controller device 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

Each of the client device 120, the client controller 125, the host device 135, and the host controller 140 typically includes one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 that permits direct or indirect communication between the client system 105 and the host system 110, irrespective of physical separation. Examples of a delivery network 160 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 also may include a personal recording communications server 165 that manages program recording communications between the client system 105 and the host system 110 and that processes the program recording communications into a data packet that is subsequently used to record a program on a personal recording device 168 of the client system 105. The data packet may be sent to the personal recording device directly or indirectly using a recording device provisioner (not shown) that further processes the data in the data packet and subsequently supplies the processed recording information to the personal recording device. The data packet also may be stored in a memory buffer 170 or similar storage device prior to being sent to the personal recording device or the recording device provisioner.

The data packet includes identification information such as user identification data, program identification data, and recording device identification data. The program identification data may be provided to the host system 110 by an external content provider server 175 or, alternatively or additionally, by an advertisement server 180. The user identification and recording device identification data may be provided by a customer information database 185, which may be included as a component of host 110.

Figure 2:
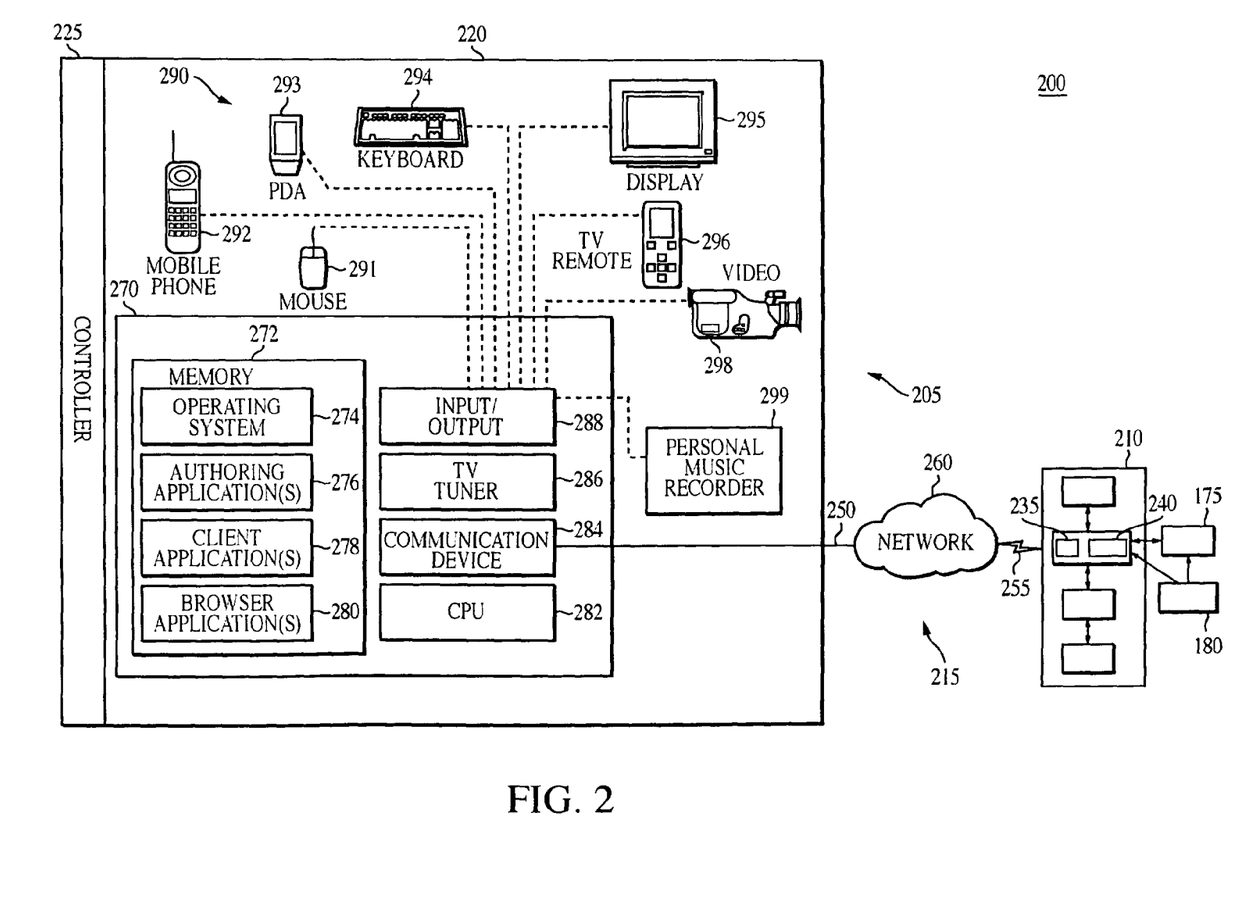
FIG. 2 is a block diagram of the communications system of FIG. 1 with a detailed view of an exemplary client system.

FIG. 2 illustrates a communication system 200 that includes a client system 205 that communicates with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 that enable communications through the one or more delivery networks 260.

Examples of each element within the communication system of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attributes comparable to, and may illustrate one possible implementation of, the client system 105 of FIG. 1.

The client device 220 typically includes a general purpose computer 270 having an internal or external storage 272 for storing data and programs such as an operating system 274 (e.g., DOS, Windows®, Windows® 95, Windows® 98, Windows® 2000, Windows® NT, Windows® Millennium Edition, Windows® XP, OS/2, Macintosh OS, and Linux) and one or more application programs. Examples of application programs include authoring applications 276 (e.g., word processing, database programs, spreadsheet programs, presentation programs, and graphics programs) capable of generating documents or other electronic content; client applications 278 (e.g., AOL client, CompuServe client, AIM client, AOL TV client, and ISP client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and executed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control 296 for receiving information from and rendering information to subscribers, a personal video recorder 298, and/or a personal music recorder 299. Other examples may include voice recognition and synthesis devices.

FIG. 2 illustrates that various devices 290 such as a mobile telephone 292, a PDA 293, a personal video recording device 298, a personal music recording device 299, and a TV remote control 296 may be peripheral to the general-purpose computer 270. However, in another implementation, one or more of these devices 290 may themselves include the functionality of the general-purpose computer 270 and/or may themselves operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some, all, or none of the components and devices described above.

Figure 3:
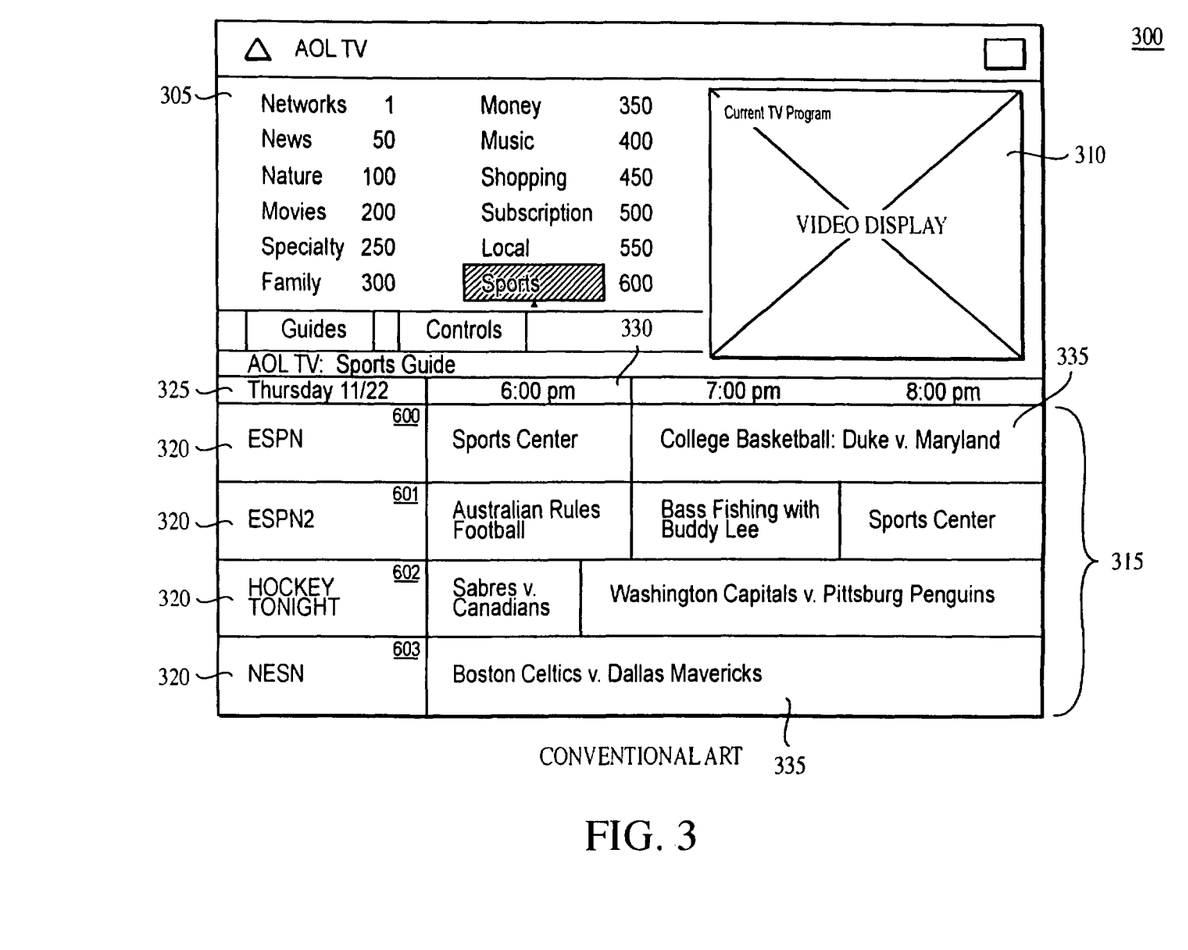
FIG. 3 is a screen display of an exemplary conventional electronic program guide.

FIG. 3 shows a conventional electronic program guide 300. The electronic program guide 300 may be used in conjunction with a personal video recording device 298 to enable recording of video programs.

The program guide 300 is a graphical display provided to the client system 105 by the host system 110 over the network 160. The program guide 300 includes a list of channel categories 305, a display of the current channel being viewed 310, and a grid 315 of the programs of a selected channel category by channel 320, date 325, and time 330. A user may select a channel category by, for example, highlighting the category using a controller (not shown) and selecting an appropriate option on the controller (e.g., an activatable button on a remote control).

When the channel category is selected, the grid 315 changes to reflect the programs of that selected channel category in duration blocks 335. FIG. 3 shows a program guide 300 in which the "Sports" channel category is selected and the grid 315, therefore, reflects sports channels and sports programs. The grid 315, for example, indicates that "Bass Fishing with Buddy Lee" is showing on ESPN2 from 7:00 pm to 7:30 pm on Thursday, Nov. 22.

The user may select a channel in the grid 315 and view that channel in the display 310. A user also may select a specific program block 335 and switch the display 310 or the channel of the TV to the channel 325 on which that program will be shown. Additionally, the user may select the program block 335, be presented with options to record that program for the current day and time along with future times, and subsequently record the program using the personal video recorder 298.

Although program guide 300 includes a channel/time matrix display (i.e., the grid 315), various other types of program guides may be used to provide the same or similar functionality as a matrix display but in a different display format. Examples include the TiVo™ Guide, the Radio Television Luxemburg (RTL) Guide, and the Zap2It™ Guide.

Figure 4:
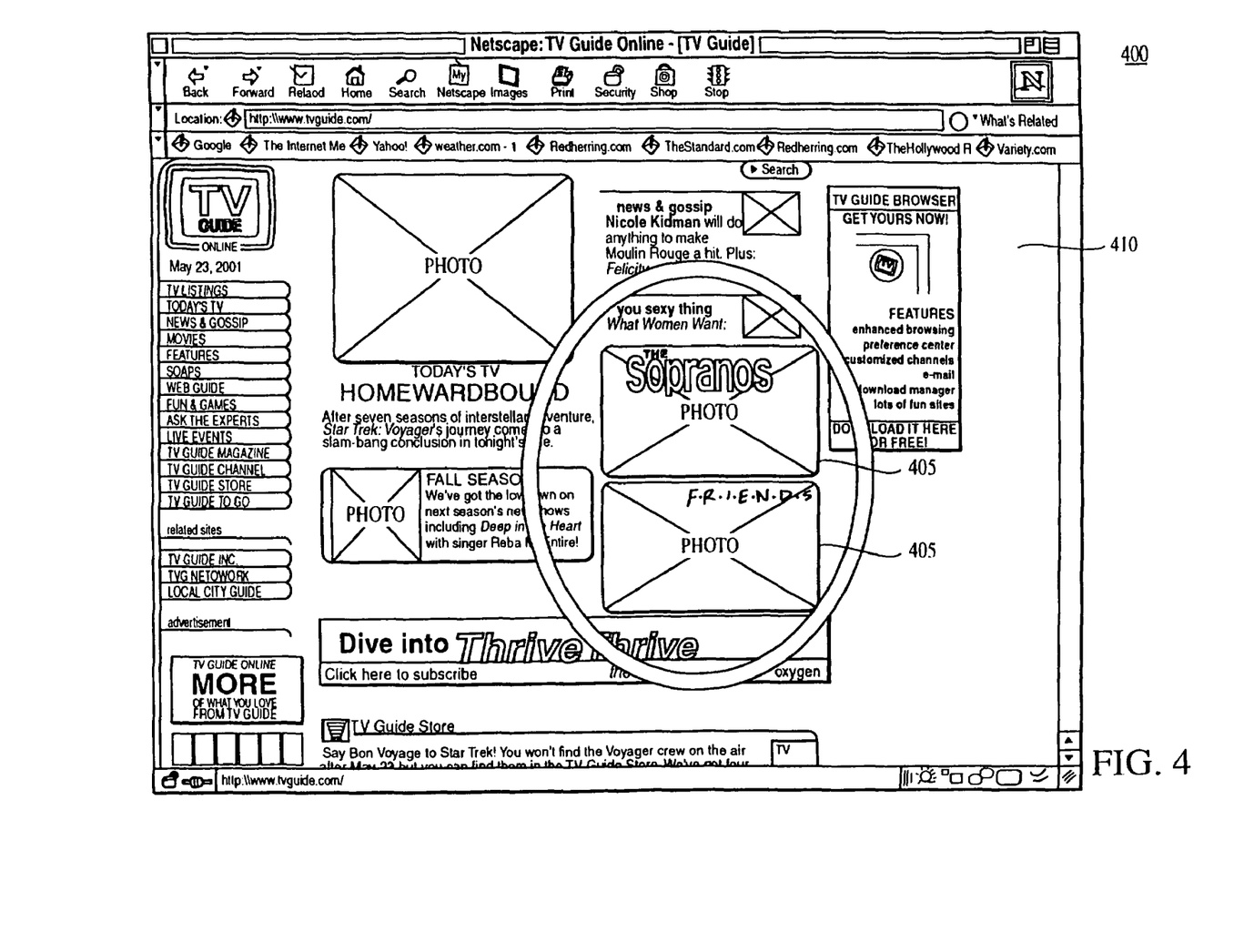
FIG. 4. is a screen display of an exemplary display including a promotional program icon.

FIG. 4 shows a display 400 in a network environment that includes promotional program icons 405 and content 410. The network environment may be, for example, the Internet, and the display may be a web page displayed using a browser application (e.g., Netscape's Navigator). The promotional program icons 405 may be, for example, banners and may include graphical images supported by embedded universal resource locator (URL) links. The promotional program icons 405 typically are independent of the content 410 or may be provided by a different source than the source that provides the content 410. Content 410 is independent of a programming guide or interface. As such, the content 410 does not include a program schedule and is not related to the recording of programs.

Figure 5A:
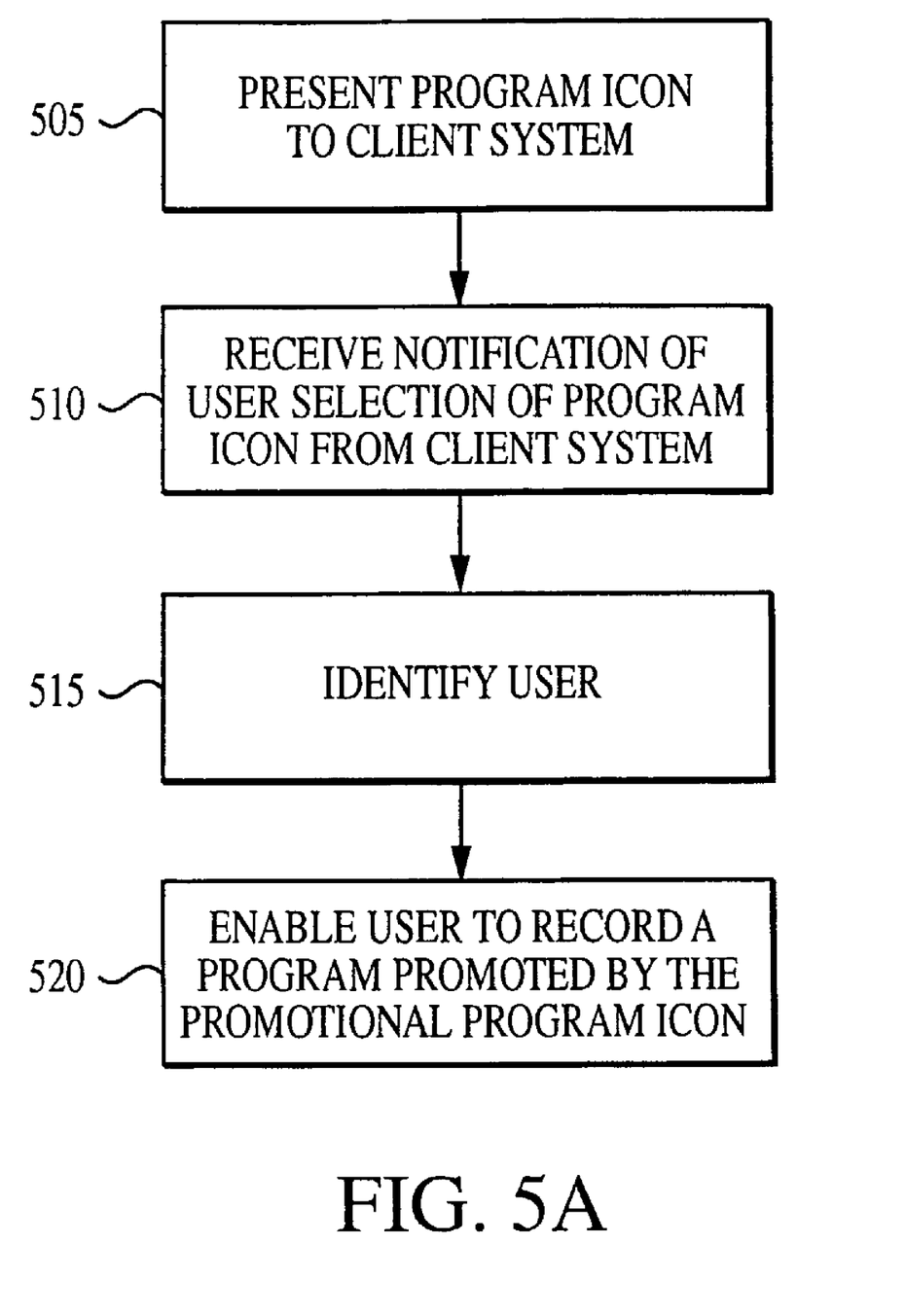
FIG. 5A is a flow chart of an exemplary process used to enable recording of programs.

FIG. 5A shows a method 500 used to enable program recording in response to user selection of promotional program icons 405 on a display. The method 500 includes presenting the promotional program icon to the client system (step 505), receiving notification of user selection of the promotional program icon from the client system (step 510), identifying the user (step 515), and enabling the user to record a program promoted by the promotional program icon (step 520).

For instance, with respect to the display 400 of FIG. 4 and communication system 100 of FIG. 1, the host system 110 presents the promotional program icon 405 to the client system 105 (step 505) and also may present the content 410 to the client system 105. The host system 110 may receive data to generate the promotional program icon 405 from the content provider server 175 or, alternatively or additionally, from the advertisement server 180. The user may select the promotional program icon 405 by placing a mouse pointer on the icon and clicking, by highlighting the icon and pressing a key on a keyboard, or otherwise. The host system 110 receives notification of the user selection of the promotional program icon in step 510. The program icon may include, for example, an embedded URL link that sends a notification packet across the network 160 to the host system 110 when the program icon is selected by the user.

The host system 110 identifies the user (step 515), for example, by accessing a screen name of the user from a login server (not shown) or, alternatively or additionally, from the customer information database 185. Identification information of the personal recording device or devices owned by the user also are accessed by the host system 110 from the customer information database 185. The recording device identification information may include the number of devices and the make and model of each device.

Figure 6:
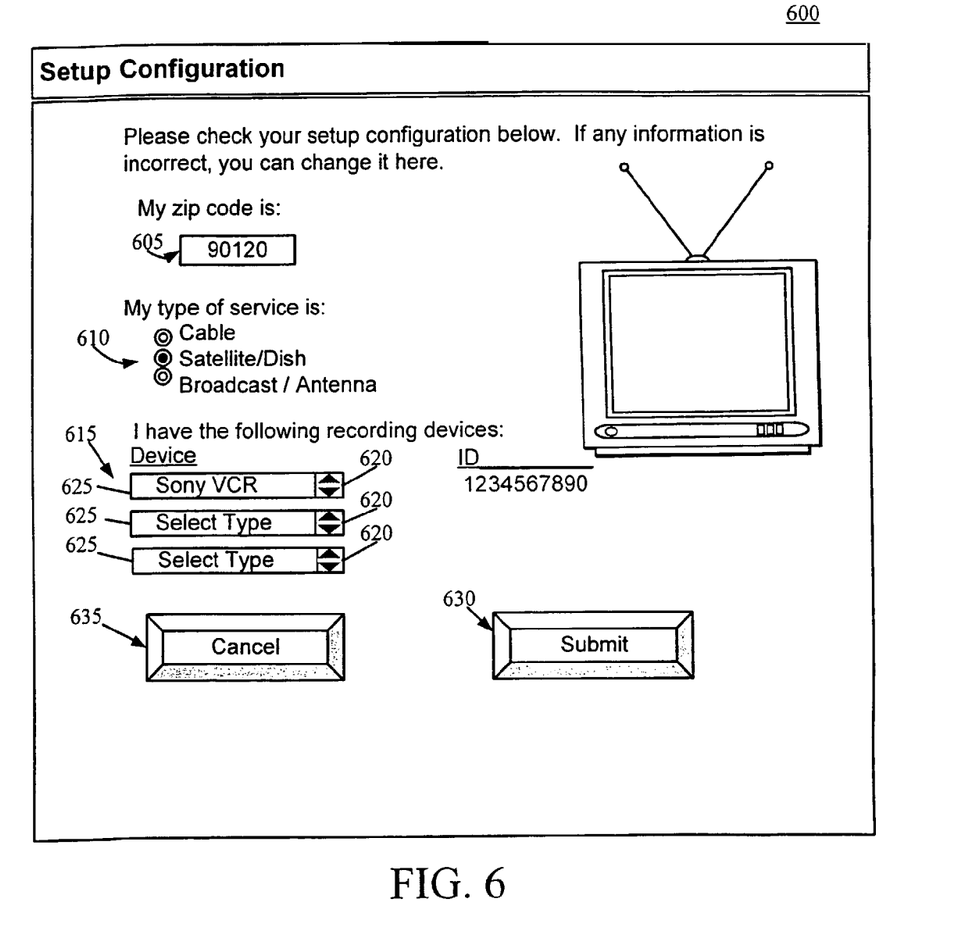
FIG. 6 is a screen display of an exemplary recording device setup configuration screen.

If the host system 110 is not able to access any identification information for the personal recording devices of the user, the host system 110 may send a setup configuration screen 600 to elicit such information from the user, as shown in FIG. 6. The setup configuration screen includes a zip code field 605, a type of service list 610, a device list 615, a cancel button 620, and a submit button 625. The user may specify his or her location by, for example, inputting a zip code into the zip code field 605. In another implementation, the user may specify his or her location by inputting an area code. The user may specify the type of service he or she receives by, for example, selecting the button next to the appropriate service in the service list 610. The user also may specify the recording devices he or she owns by, for example, scanning through a list of devices by selecting the arrows 620 next to the device fields 625. The arrows 620 toggle through the device types supported by the host system 110. The user may submit a recording device identification number or a make and model, as necessary, using an interstitial splash screen (not shown). Upon completion of the setup configuration, the user may submit the configuration to the host system 110 by selecting the submit button 625 or, alternatively, the user may restart the setup configuration by selecting the cancel button 620.

Figure 5B:
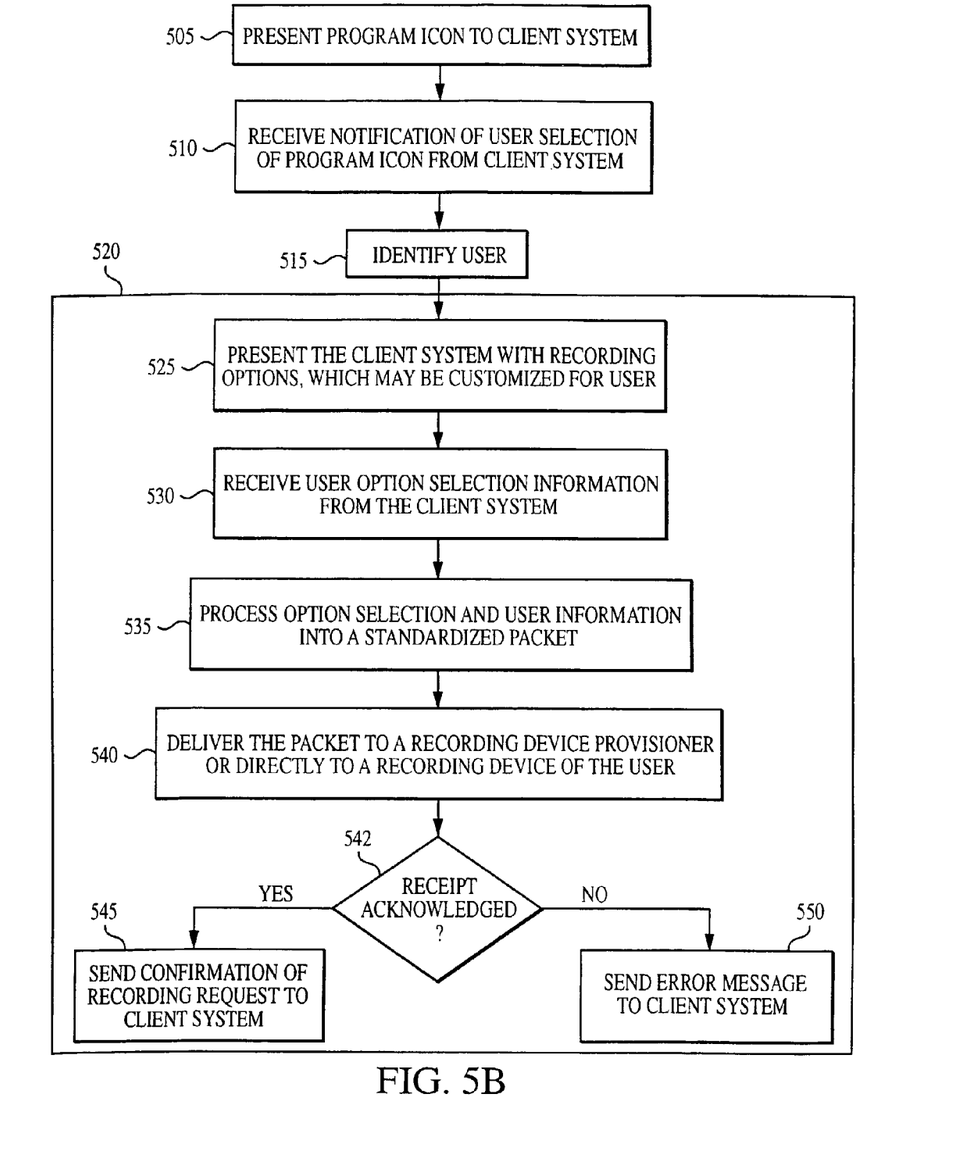
FIG. 5B is a flow chart of the process of FIG. 5A with substeps exemplifying one method of enabling the user to record a program promoted by the promotional program icon.

FIG. 5B shows one implementation of the method 500 of FIG. 5A, where step 520 is divided into exemplary substeps. Specifically, enabling a user to record a program promoted by the promotional program icon (step 520) includes presenting the client system with recording options that may be customized for the user (step 525), receiving user option selection information from the client system (step 530), processing option selection and user information into a standardized packet (step 535), delivering the packet to a recording device provisioner or directly to a recording device of the user (step 540), and, if receipt of the packet is acknowledged from the recording device provisioner or the recording device (step 542), sending a message confirming the recording request to the client system (step 545). If a receipt is not acknowledged, an error message is sent to the client system (step 550) stating that the recording request was not successful and providing applicable error information as supplied by the recording device provisioner or the recording device.

Presenting the client system with recording options (step 525) includes presenting the client system 105 with the option to record one or more programs promoted by the promotional program icon 405. If the promotional program icon promotes more than one program, an interstitial screen may be presented to the user to allow the user to select the desired program from a list of the promoted programs.

Figure 7:
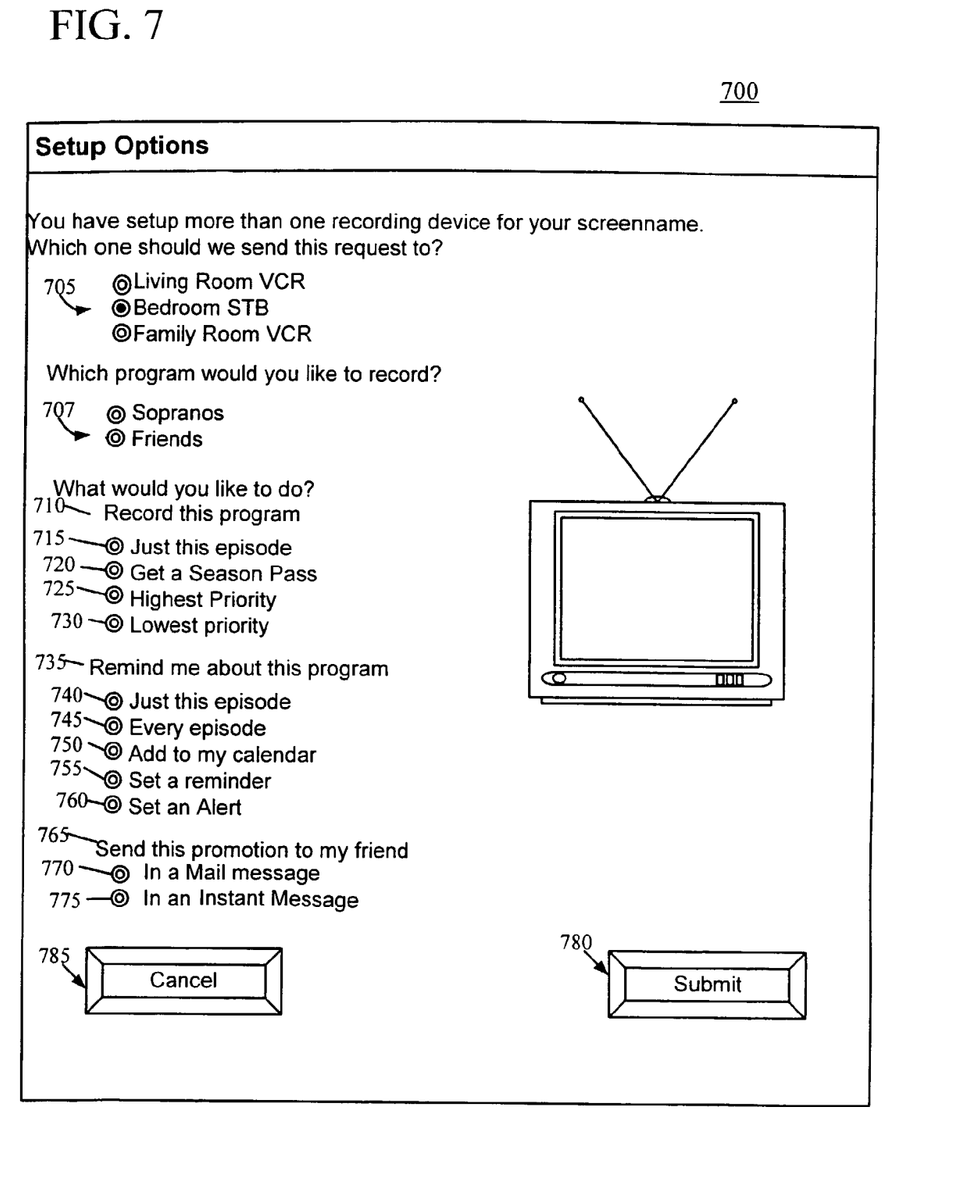
FIG. 7 is a screen display of an exemplary menu of recording device setup options.

Alternatively, the desired program may be selected from the list of promoted programs by adding the list 707 to a menu of options 700 presented to the user, as shown in FIG. 7. The options 700 may be customized to the user based on the user identification data gathered in step 515. The options 700 include the option to specify the recording device used to record the desired program, for example, by selecting a button next to the appropriate device from a list 705 of the recording devices owned by the user. The list 705 of recording devices may include a device type and a device description, as specified by the user of the device. The description may be, for example, the location of the device in the home of the user.

The options 700 also may include various recording options 710. These recording options 710 include, for example, the option to record the program one time 715, record the program multiple times 720 (e.g., record the program for the whole season), set the recording priority to high 725, and set the recording priority to low 730. The recording priority settings 725 and 730 are used to allow the user to specify whether the program should be recorded if/when the recording schedule of the program conflicts with the recording schedule of another program. The recording options also may include the option to set a preferred list (not shown) of programs to record.

The options 700 also may include various reminder options 735. The reminder options 735 include, for example, the option to automatically remind the user about one particular episode of the program 740 at a predetermined time prior to that particular episode being shown, automatically remind the user about every episode of the program 745 at a predetermined time prior to each episode being shown, add the program to the calendar of the user 750, allow the user to manually set a reminder 755 at a specified time, and set an alert 760 for the program that will alert the user using a sequence of communication steps set up when the user registered for an alert service.

The options 700 also may include sending options 765 to electronically send the promotional program icon 405 to another user. The sending options 765 include, for example, the option to send the promotional program icon 405 to another user in an e-mail 770 and the option to send the promotional program icon 405 to another user in an instant message 775.

Once a user of the client system 105 chooses from among the options 700, the user may submit the recording request by, for example, selecting a submit button 780. If at any time the user decides not to proceed with the recording request, the user may select the cancel button 785 to exit the menu of options 700 without submitting a request.

The recording request of the user is sent to the personal recording communications server 165 of the host system 110 (step 530). The personal recording communications server 165 generates a data packet based on the information submitted by the user along with program, user, and recording device identification information (step 535).

The data packet may be presented in a standardized format that is recognized by recording devices and/or by recording device provisioners. The data packet may include user identification information, such as the screen name of the user, recording device identification information, such as the make and model of the recording device, program identification information, and option selection information.

The program identification information may include a program identification (ID) number (e.g., a Tribune Media Services ID number) and program schedule data. The program schedule data may include a date and time when the program is scheduled to air, a program network affiliation (used to determine the channel, network, or station that will air the program), and the duration of the program.

The option selection information includes information related to the recording options 710 selected by the user. The selected recording options may be, for example, incorporated into the data packet through the use of a repeat flag and a priority flag.

The repeat flag indicates whether the user wishes to record one or more episodes of the program. In this implementation, the repeat flag has two values, NO or YES. If the repeat flag is set to NO, the user has selected the option to record only one episode of the program. The time, date, and duration program identification information may then be used by the recording device or the recording device provisioner to set up the recording of the episode. If the repeat flag is set to YES, the user has selected the option to record multiple episodes of the program (e.g., the whole season). The date, time, and duration program identification information is then only applicable for the first recording. The recording device or recording device provisioner typically accesses data from a program guide (e.g., similar to guide 300) in order to obtain the date, time, and duration of future episodes.

The priority flag sets the priority level of the recording schedule of the program. In this implementation, the priority flag has two values, HIGH or LOW. When the priority flag is set to HIGH, the program recording schedule will take precedence over any conflicting program recording schedules that were assigned LOW priority levels when originally set up by the user. Assigning a recording program schedule a HIGH priority level also results in the program recording taking precedence over any conflicting program recording schedules that were assigned a HIGH priority level but were set up previously by the user. When the priority flag is set to LOW, the program recording schedule will only take precedence over any conflicting recording schedules that were assigned a LOW priority level and set up previously by the user.

Both the repeat and the priority flags may differ in implementation from the preceding description. For example, the repeat flag may include information relating to a specific number of episodes to record, and the priority flag may include more advanced conflict resolution settings usable by recording devices with local conflict resolution hardware (e.g., high priority level recording schedules take precedence UNLESS the program recorded is "Seinfeld"). Advanced uses of the repeat flag and the priority flag may be specific to certain recording devices and to certain recording device provisioners.

In one implementation, the data packet incorporates information relating to user selection of reminder options 735 and user selection of sending options 765. However, in other implementations, the selection information related to these options is processed by the host system 110 rather than by the recording device or recording device provisioner. As such, the data packet may not incorporate such information.

The data packet is delivered to one or more of the recording devices 298 or 299 of the client system 105, the recording device provisioner (not shown), or the memory buffer 170 of the host system 110 (step 540). Storage of the data packet in the memory buffer 170 makes the packet accessible at any time to the recording devices 298 or 299 of the client system 105 and/or the recording device provisioner.

If the user has multiple recording devices and decides to record the program on more than one recording device (e.g., by selecting more than one device from the list 705), a data packet will be sent for each recording device. The multiple data packets may have different recording device identification information and different recording options information.

Figure 8:
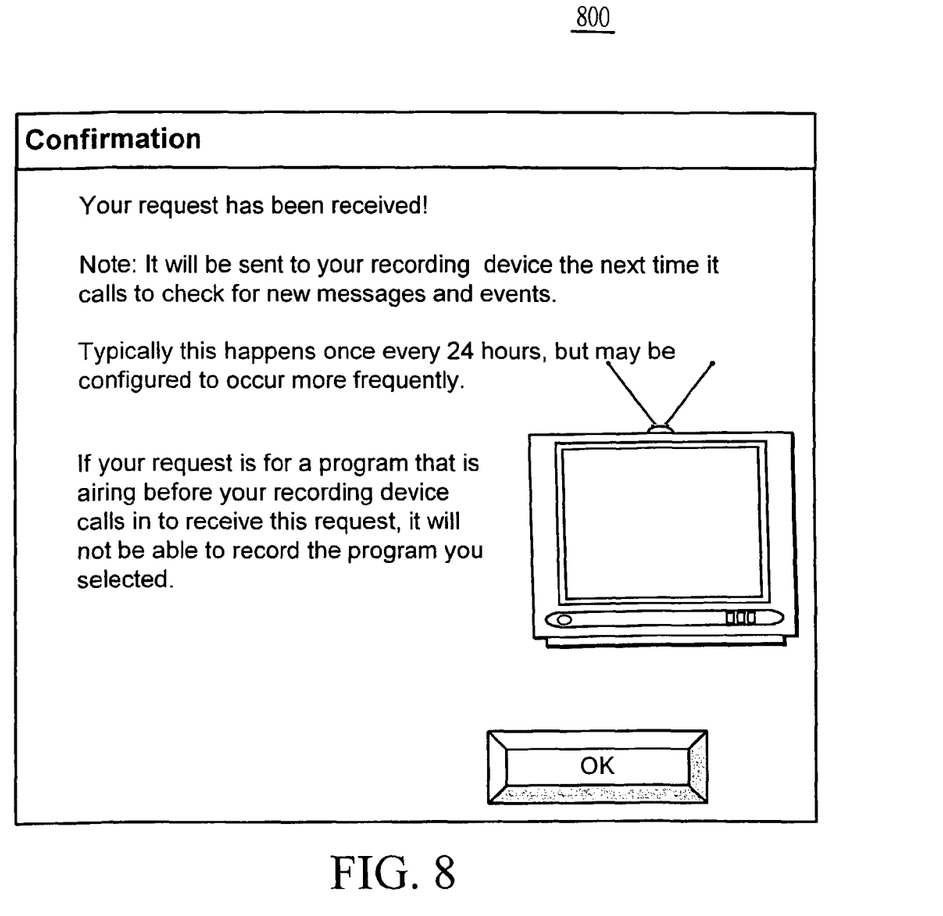
FIG. 8 is a screen display of an exemplary recording request confirmation screen.

After sending the data packet, the host system 110 waits for an acknowledgement of receipt of the data packet from the recording device provisioner, the memory buffer 170, or the recording device (step 542). If the data packet is successfully received by the recording device provisioner, the memory buffer 170, or the recording device, the host system 110 sends a confirmation screen to the client system 105 (step 545). The confirmation screen may be similar to the confirmation screen 800 shown in FIG. 8. If no acknowledgement is received, the host system 110 may send an error message screen (not shown) to the user stating that the request was not received (step 550). The error message screen may include specific details regarding the inability to reach the recording device, the recording device provisioner, or the memory buffer 170 (e.g., the servers of the recording device provisioner are not responding).

Figure 9:
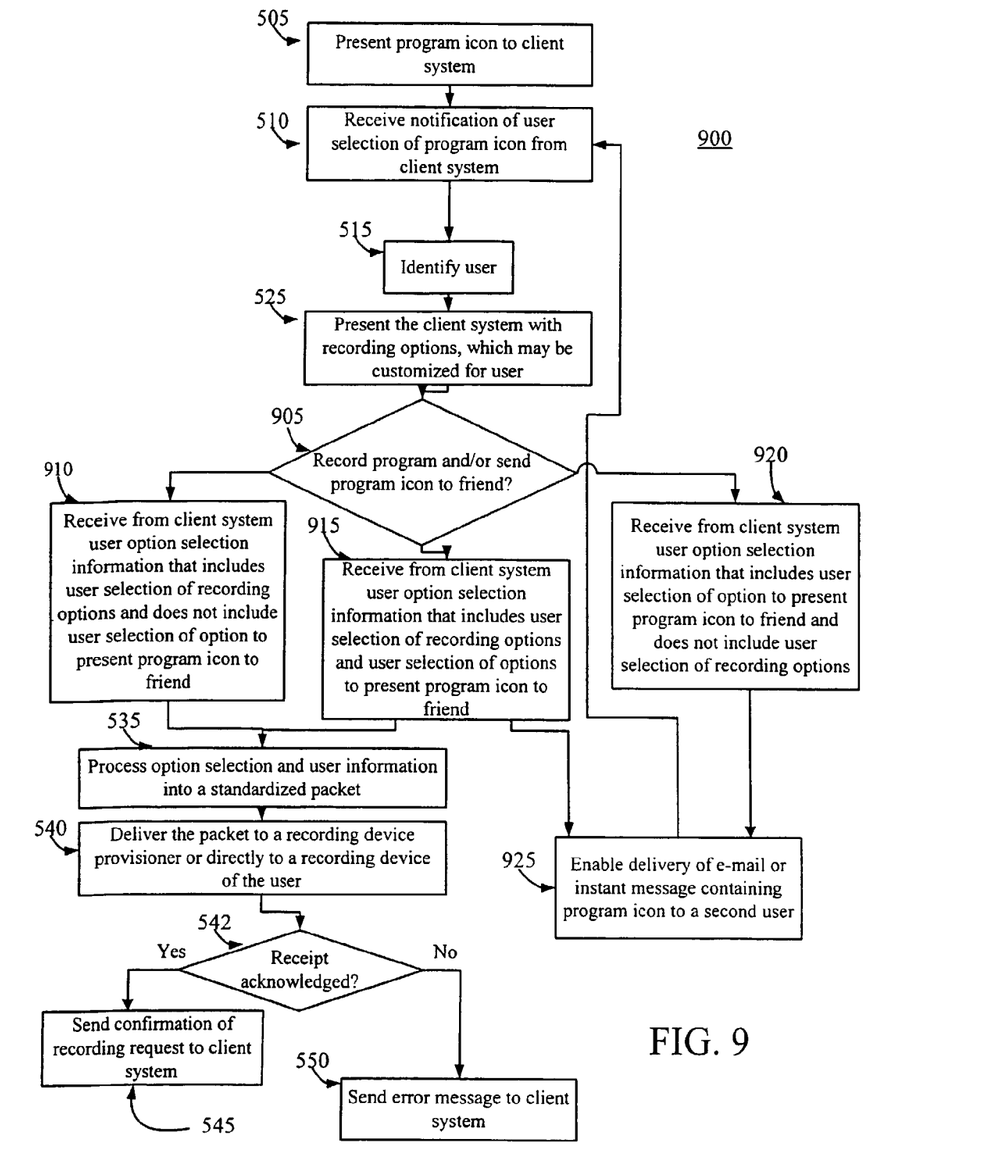
FIG. 9 is a flow chart of the process of FIG. 5B with additional substeps exemplifying one method for electronically sending the promotional program icon from one user to another.

FIG. 9 shows a method 900 that is similar to the method 500 with the exception that the method 900 provides exemplary steps used to send the promotional program icon 405 electronically to another user. As in the method 500, the method 900 includes presenting the program icon to the client system (step 505), receiving notification of the user selection of the program icon at the host system (step 510), identifying the user (step 515), and presenting the client system with recording options which may be customized (step 525). The user of the client system 105 may then decide whether to record the program promoted by the promotional icon and whether to send the icon to another user (step 905).

The user may decide to record the program and not send the promotional program icon (step 910) to another user. The user may accomplish this by, for example, selecting at least one of the recording options 710 and not selecting any of the sending options 765. The next steps in the method 900 are the same as those in the method 500. In other words, the options selection information and user information are processed into a packet (step 535), the packet is delivered to a recording device or a recording device provisioner (step 540), and a confirmation of the request is sent to the client system (step 545).

Alternatively, the user of the client system 105 may decide to both record the program promoted by the promotional program icon and send the icon to another user (step 915). The user may accomplish this by, for example, selecting at least one of the recording options 710 and selecting at least one of the sending options 765. Upon submitting the options to the personal recording communications server 165 by, for example, selecting the submit button 780 in the options menu 700, the process to record the program proceeds as before through steps 535, 540, and 545.

The user of the client system 105 may instead decide to send the promotional program icon to another user without recording any of the programs promoted by the promotional program icon (step 920). The user may accomplish this by, for example, not selecting any recording options 710 and selecting at least one of the sending options 765. The user may then submit the options to the personal recording communication server 165 by, for example, selecting the submit button 780 in the options menu 700.

If the user chooses to send the promotional program icon to another user (either step 915 or step 920), the user is presented with an interface that may be used to send the promotional program icon to another user (step 925). When the user chooses to both send the program icon and to record one or more of the programs presented by the icon (step 915), the interface used to send the icon may be presented to the user before, after, or concurrent to any of steps 535, 540, and 545.

Figure 10:
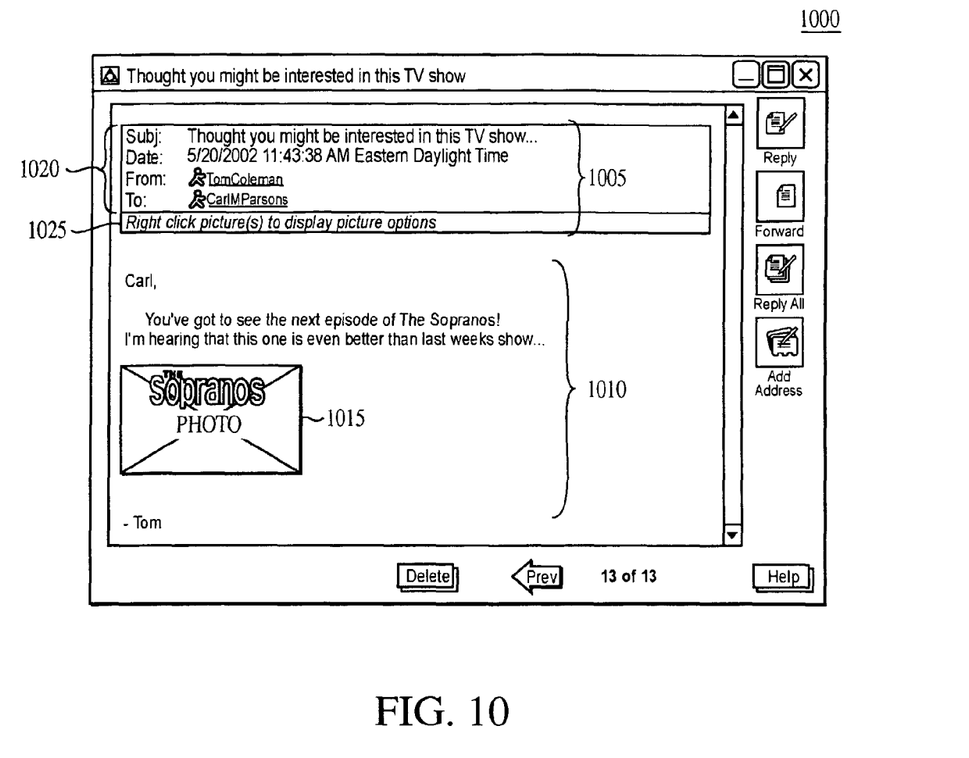
FIG. 10 is a screen display of an example of an e-mail message including a promotional program icon.

For example, if the user chooses to send the promotional program icon using e-mail by selecting the e-mail option 770, the user is presented with an e-mail interface that allows the user to send an e-mail 1000 similar to that shown in FIG. 10. The e-mail may vary depending on the e-mail applications supported by the client system 105. The e-mail includes a body 1005 and a header 1010. The body includes an embedded promotional program icon 1015 that may include a graphic and a link backed up by a URL. The user may directly type content into the e-mail message body 1005.

The header 1010 may include typical e-mail fields 1020 (e.g., Subject, Date, From, and To). The header 1010 also may include instructions 1025 that inform the recipient of the e-mail that selecting the promotional program icon provides access to a set of options related to the program promoted by the icon.

The recipient of the e-mail may select the promotional program icon 1015 by, for example, right-clicking on the icon. Upon selecting the promotional program icon 1015, the recipient of the e-mail is presented with the menu of options 700 in a manner that is the same or similar to the presentation of menu options 700 to the sender of the e-mail when the sender originally selected the promotional program icon 415 in display 400. The recipient may then send the promotional program icon 1015 to yet another user by selecting one of the sending options 765. In this way, the promotional program icon may be replicated and sent repeatedly to other users. This ability to repeatedly send the promotional program icon results in a viral multiplication of the icon over time. Users also may be able to replicate and send the promotional program icon 1015 to others by simply selecting the reply or forward options of the e-mail application.

The promotional program icon also may be replicated and sent to other users through instant messaging. A user may send the icon in an instant message by selecting option 775. The implementation of sending a promotional program icon to another user through an instant message may be analogous to that of sending a promotional program icon through an e-mail message. The icon is embedded in the content of the instant message and is sent to the other user immediately. Selecting the promotional program icon in the instant message provides the user access to the menu of options 700 as before.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

A number of implementations have been described. Nevertheless, it will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for enabling a first user to send to a second user a promotional program icon configured to enable recording of a program promoted by the icon, the method comprising:

enabling a first user to perceive a web page that displays a promotional program icon that is user-selectable to record a program promoted by the promotional program icon;

receiving an indication that the first user has selected the promotional program icon displayed in the web page; and in response to the indication, enabling the first user to perceive a set of options selectable by the first user that include an option selectable to record the program promoted by the promotional program icon and an option selectable to present the promotional program icon to a second user in a display perceivable by the second user, the promotional program icon presented to the second user in the display being selectable by the second user to record the program promoted by the promotional program icon.

2. The method of claim 1 wherein the program promoted by the promotional program icon is a video program.

3. The method of claim 1 further comprising receiving a selection from the first user of the option to present the promotional program icon to the second user and, in response to the selection, electronically sending the promotional program icon to the second user.

4. The method of claim 3 wherein electronically sending the promotional program icon includes sending an e-mail including the promotional program icon to the second user such that the second user may select the promotional program icon in the e-mail to record the program promoted by the promotional program icon.

5. The method of claim 3 wherein electronically sending the promotional program icon includes sending an instant message including the promotional program icon to the second user such that the second user may select the promotional program icon in the instant message to record the program promoted by the promotional program icon.

6. The method of claim 1 wherein the promotional program icon comprises a banner.

7. The method of claim 1 wherein the set of options dynamically changes based on identification data including at least one of user identification data and recording device identification data.

8. The method of claim 1 wherein the set of options further includes at least one of recording the program promoted by the promotional program icon one time and recording the program promoted by the promotional program icon periodically.

9. The method of claim 1 wherein the set of options further includes adding schedule data of the program promoted by the promotional program icon to a calendar of the user.

10. The method of claim 1 wherein the set of options further includes setting an alert that will inform the user when the program is being shown or will be shown.

11. The method of claim 1 wherein the set of options further includes adding the program promoted by the selected promotional icon to a preferred list of programs to record.

12. The method of claim 1 wherein the set of options further includes setting a conflict priority rating used to determine whether the program will be recorded when a recording schedule of the program conflicts with a recording schedule of another program.

13. The method of claim 3 further comprising enabling the second user to perceive a set of options upon the second user selecting the promotional program icon in the display, the set of options being selectable by the second user and including an option selectable by the second user to record the program promoted by the promotional program icon and an option selectable by the second user to present the promotional program icon to a third user in a second display perceivable by the third user, the promotional program icon presented to the third user being selectable by the third user to record the program promoted by the promotional program icon.

14. A computer system including a computer readable storage medium storing a computer program for enabling a first user to send to a second user a promotional program icon configured to enable recording of a program promoted by the icon, the computer program including code segments structured and arranged to:
- enable a first user to perceive a web page that displays a promotional program icon that is user-selectable to record a program promoted by the promotional program icon;
- receive an indication that the first user has selected the promotional program icon displayed in the web page; and
- in response to the indication, enable the first user to perceive a set of options selectable by the first user that include an option selectable to record the program promoted by the promotional program icon and an option selectable to present the promotional program icon to a second user in a display perceivable by the second user, the promotional program icon presented to the second user in the display being selectable by the second user to record the program promoted by the promotional program icon.

15. The computer system of claim 14 wherein the program promoted by the promotional program icon is a video program.

16. The computer system of claim 14 further comprising a code segment for receiving a selection from the first user of the option to present the promotional program icon to the second user and a code segment for electronically sending the promotional program icon to the second user in response to the selection.

17. The computer system of claim 16 wherein the code segment for electronically sending the promotional program icon includes a code segment for sending an e-mail including the promotional program icon to the second user such that the second user may select the promotional program icon in the e-mail to record the program promoted by the promotional program icon.

18. The computer system of claim 16 wherein the code segment for electronically sending the promotional program icon includes a code segment for sending an instant message including the promotional program icon to the second user such that the second user may select the promotional program icon in the instant message to record the program promoted by the promotional program icon.

19. The computer system of claim 14 wherein the promotional program icon comprises a banner.

20. The computer system of claim 14 wherein the code segment for enabling the first user to perceive a set of options includes a code segment for enabling the first user to perceive and select among a set of options that dynamically changes based on identification data including at least one of user identification data and recording device identification data.

21. The computer system of claim 14 wherein the code segment for enabling the first user to perceive a set of options includes a code segment for enabling the user to perceive and select at least one of an option for recording the program promoted by the promotional program icon one time and an option for recording the program promoted by the promotional program icon periodically.

22. The computer system of claim 14 wherein the code segment for enabling the first user to perceive a set of options includes a code segment for enabling the user to perceive and select an option for adding schedule data of the program promoted by the promotional program icon to a calendar of the user.

23. The computer system of claim 14 wherein the code segment for enabling the first user to perceive a set of options includes a code segment for enabling the user to perceive and select among options for setting an alert that will inform the user when the program is being shown or will be shown.

24. The computer system of claim 14 wherein the code segment for enabling the first user to perceive a set of options includes a code segment for enabling the user to perceive and select an option for adding the program promoted by the selected promotional icon to a preferred list of programs to record.

25. The computer system of claim 14 wherein the-code segment for enabling the first user to perceive a set of options includes a code segment for enabling the user to perceive and select among options for setting a conflict priority rating used to determine whether or not the program will be recorded when a recording schedule of the program conflicts with a recording schedule of another program.

26. The computer system of claim 14 further comprising a code segment for enabling the second user to perceive a set of options upon the second user selecting the promotional program icon in the display, the set of options being selectable by the second user and including an option selectable by the second user to record the program promoted by the promotional program icon and an option selectable by the second user to present the promotional program icon to a third user in a second display perceivable by the third user, the promotional program icon presented to the third user being selectable by the third user to record the program promoted by the promotional program icon.

27. An apparatus for enabling a first user to send to a second user a promotional program icon configured to enable recording of a program promoted by the icon, the apparatus comprising:
- means for enabling a first user to perceive a web page that displays a promotional program icon that is user-selectable to record a program promoted by the promotional program icon;
- means for receiving an indication that the first user has selected the promotional program icon displayed in the web page; and
- means for, in response to the indication, enabling the first user to perceive a set of options selectable by the first user that include an option selectable to record the program promoted by the promotional program icon and an option selectable to present the promotional program icon to a second user in a display perceivable by the second user, the promotional program icon presented to the second user in the display being selectable by the second user to record the program promoted by the promotional program icon.

28. The method of claim 1 wherein the program promoted by the promotional program icon comprises a television broadcast program.

29. The computer system of claim 14 wherein the program promoted by the promotional program icon comprises a television broadcast program.

30. The method of claim 1 wherein enabling the first user to perceive the set of options comprises presenting to the first user the set of options.

31. The computer system of claim 14 wherein the code segment for enabling the first user to perceive the set of options comprises a code segment for presenting to the first user the set of options.

32. A method for enabling a first user to send to a second user a promotional program icon configured to enable recording of a program promoted by the icon, the method comprising:

enabling a first user to perceive a web page that includes a promotional program icon that is user-selectable to record a program promoted by the promotional program icon;

receiving a selection from the first user of the promotional program icon;

in response to the selection of the promotional program icon, presenting the first user with an option to communicate the promotional program icon to a second user in an e-mail or in an instant message such that the promotional program icon is perceivable by the second user when perceiving message text of the e-mail or the instant message in a display and is selectable by the second user to record the program promoted by the promotional program icon;

receiving a selection from the first user of the option to communicate the promotional program icon to the second user; and     in response to the selection of the option by the first user to communicate the promotional program icon to the second user, communicating the promotional program icon and message text inputted by the first user in an e-mail or in an instant message to the second user.

\* \* \* \* \*